Patented Feb. 26, 1946

2,395,414

UNITED STATES PATENT OFFICE 2,395,414

PRODUCTION OF KETO-ALCOHOLS

James Lincoln and James Gordon Napier Drewitt, London, England, assignors to British Celanese Limited, London, England, a company of Great Britain No Drawing. Application August 10, 1943, Serial No. 498,100. In Great Britain August 20, 1942

7 Claims. (Cl. 260—594)

This invention relates to a process for the production of keto alcohols wherein a ketone containing the groups

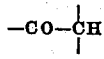

is condensed under alkaline conditions with an aliphatic aldehyde. The invention is especially useful for condensations wherein the ketone contains the grouping —CO—CH$_2$— and it is desired to obtain the ketoalcohol, that is the product of reaction between one mole only of aldehyde and one mole of ketone, as opposed to the keto poly alcohols resulting from the reaction of more than one mole of aldehyde with one mole of ketone. More particularly is the invention concerned with the production of 3-ketobutanol by the condensation in a slightly alkaline medium of one mole of acetone with one mole of formaldehyde, and consequently it will be described with special reference to the production of this body.

It is well known that when acetone is condensed with formaldehyde under slightly alkaline conditions, there is formed in addition to the 3-ketobutanol certain undesired by-products and in particular a resinous material, doubtless formed by the condensation of one mole of acetone with more than one mole of formaldehyde. Presumably with the object of moderating the amount of undesired resinous material formed, the condensation has hitherto been carried out at temperatures of the order of room temperature or up to 30° C.

According to the present invention, however, ketoalcohols are prepared by condensing aliphatic aldehydes with ketones containing the group

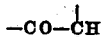

under mildly alkaline conditions at a temperature of at least 40° C. Thus with acetone and formaldehyde not only is the reaction period considerably reduced at this relatively high temperture as compared with the similar reaction at, for example, 20–30° C., but in addition the yield of 3-ketobutanol is increased and the resin formation slightly reduced. Furthermore, as compared with the reaction at lower temperatures, smaller quantities of catalyst may be employed and the reaction still be completed in a relatively short time. Consequently the invention results in an economy in both time and material, as well as providing improved yields of the desired ketoalcohol.

In the preferred form of the invention, and particularly when the ketone contains the grouping —CO—CH$_2$—, the reaction is effected at the relatively high temperature in the presence of a large excess of the ketone. Thus it is desirable to use at least five moles of ketone for each mole of aldehyde, and in the case of the condensation of formaldehyde with acetone it is preferable to use ten, twenty or more moles of acetone for each mole of formaldehyde. Under these conditions, not only is the reaction time reduced still further, but the tendency to resin formation is also reduced and the yield of 3-ketobutanol increased.

While very good results are obtained by carrying out the reaction at, for example, 40–50° C., the improved results can be obtained in a shorter time by using still higher temperatures, for examply carrying out the reaction at the usual boiling point of the reaction medium, which in the case of acetone will be about 55–60° C. or more, depending on the amount and nature of the diluent present. By carrying out the condensation under pressure, the reaction can be effected at temperatures above the boiling point of the reaction mixture. When no diluent is present, and paraformaldehyde is employed as the source of formaldehyde, the reaction is preferably effected at a temperature of about 50° C.

The reaction can be carried out in the absence of any diluent, but it is preferable in the case of acetone and formaldehyde to have water present in the reaction mixture. Thus by using the commercial 30–40% formalin as the source of formaldehyde and without the addition of further water, the amount of water present will be about 1.5 to 3 times that of the formaldehyde. If desired, however, the amount of water in the reaction medium may be much greater than the above, for example 10–30 times the amount of formaldehyde. The condensation in the presence of water can be effected by means of almost any alkaline catalyst, for example soduim hydroxide, sodium or potassium carbonate, sodium sulphite, sodium sulphide or a tertiary organic amine, but in those cases where it is desired to use only a small amount of water it is preferable to use caustic soda as the catalyst. Another catalyst which can be used is sodium bisulphite, as this compound while forming a slightly acid solution in water only, becomes alkaline in the presence of formaldehyde, presumably owing to the formation of an alkaline reacting formaldehyde-bisulphite complex.

To obtain the best results, the reaction mixture should be neutralised or made slightly acid, just as soon as the formaldehyde has substantially all reacted, as in this way formation of diacetone alcohol by self-condensation of the acetone is minimised. The end of the reaction can be determined by testing samples of the reaction mixture for formaldehyde, e. g. with aniline acetate.

When carrying out the reaction under anhydrous conditions, or in the presence of an organic diluent, it has been found that good results can be obtained by using as catalyst sodium ethoxide dissolved in a small amount of alcohol.

As mentioned above, the reaction can be carried out in a very short time when using exceptionally small amounts of catalyst. Thus, with an acetone: formaldehyde ratio of 10 moles to 1, and temperature of about 65° C., it is possible to effect the condensation within a period of 3 or 4 minutes, even when using only .3 parts of caustic soda per 100 parts of formaldehyde. If a slightly larger amount of catalyst is used, the reaction can be effected in a still shorter time at this temperature or in a similar time at a lower temperature, for example 50 or 55° C. Also, the reaction time can be shortened and improved yields obtained by using a larger molar excess of acetone. Advantageously the amount of catalyst employed will be such that the reaction period is not more than about 30 minutes.

After the reaction mixture has been neutralised or rendered slightly acid, for example with acetic acid, the ketoalcohol can be isolated by distilling off the excess ketone and some of the water, if that is present, at atmospheric pressure, then distilling off the remainder of the water under reduced pressure. However, it is also possible to separate the ketoalcohol by salting out from the reaction mixture with, for example, potassium carbonate or ammonium sulphate, preferably after removal of the acetone. If desired, after removal of the acetone and if the condensation has been effected in the presence of water, the ketoalcohol can be extracted by salting out with some substantially neutral salt, for example ammonium sulphate, and then extracted with some relatively low-boiling, water-immiscible solvent for the ketoalcohol, for example methylene chloride.

As ketoalcohols are very useful intermediates for the production of the corresponding diols, it may not be necessary in some cases to isolate the ketoalcohol itself, as it can be hydrogenated after removal of the acetone and the diol then separated from the water or other diluent, if present, by fractionation at ordinary or reduced pressure. The invention is illustrated by the following examples, all parts being by weight.

*Example I*

To a gently boiling mixture of 350 parts of acetone and 150 parts of water are added simultaneously 20 parts of 40% formalin and .2 parts of $Na_2SO_3 \cdot 7H_2O$ dissolved in 5 parts of water. The mixture is boiled for 3 or 4 minutes, at the end of which time substantially all the formaldehyde has disappeared. It is then rendered slightly acid with acetic acid and the acetone and part of the water removed by distillation on a water-bath at ordinary pressure. The remainder of the water is removed by evaporation under reduced pressure and the residual ketoalcohol fractionated under further reduced pressure. In this way there is obtained a good yield of a product (boiling about 75–80° C. at 15 mms.) which consists largely of 3-ketobutanol.

*Example II*

90 parts of 40% formalin and .15 parts of caustic soda dissolved in 10 parts of water are added with stirring to 2100 parts of acetone, the temperature of the mixture being about 50° C. After about 10 minutes substantially all the formaldehyde has disappeared and on working up the mixture as in Example I, there is obtained about a 70% yield (calculated as ketobutanol and based on the formaldehyde used) of a product consisting mainly of 3-ketobutanol.

*Example III*

90 parts of 40% formalin and .15 parts of caustic soda dissolved in 10 parts of water are added with stirring to a mixture of 2100 parts of acetone and 400 parts of water, the temperature of the mixture being about 50° C. The reaction mixture is stirred at this temperature for about 10 minutes, at the end of which time substantially all the formaldehyde has disappeared. The acetone is removed by distillation at ordinary pressure, and on salting out the residual aqueous product with ammonium sulphate, extracting with methylene chloride and distilling off the methylene chloride, there is obtained a product which on fractionation under reduced pressure leaves very little resin, and gives 3-ketobutanol in a yield of the same order as in Example II.

*Example IV*

To a well-stirred mixture of 2100 parts of acetone and 36 parts of anhydrous paraformaldehyde, there is added with vigorous stirring .22 parts of sodium ethoxide dissolved in 5 parts of of ethyl alcohol, the temperature of the mixture being about 50° C. The paraformaldehyde dissolves almost immediately and after 7 or 8 minutes the reaction mixture is substantially free from formaldehyde. It is then rendered slightly acid by the addition of acetic acid and the acetone removed by distillation at ordinary pressure. The residual ketoalcohol on distillation at reduced pressure also gives a yield of the same order as in Example II of a product consisting mainly of 3-ketobutanol.

*Example V*

To a well-stirred mixture of 2800 parts of acetone and 24 parts of anhydrous paraformaldehyde, there is added at a temperature of about 50° C., .18 parts of sodium ethoxide dissolved in 4 parts of ethyl alcohol. The paraformaldehyde dissolves immediately and the reaction mixture is substantially free from formaldehyde after about 10 minutes. After neutralising, removing the acetone and distilling the residue under reduced pressure, there are obtained about 56 parts of 3-ketobutanol. On the basis of the paraformaldehyde used, this corresponds to a yield of about 80%.

*Example VI*

40 parts of 40% formalin and .15 part of NaOH in 20 parts of water are added with stirring to a mixture of 1100 parts of methyl ethyl ketone and 150 parts of water, the temperature of the mixture being about 50° C. After about ten minutes, substantially all the formaldehyde has disappeared, and on removing the excess methyl ethyl ketone and water, there is isolated by distillation under reduced pressure about 43 parts of 2-methyl-3-ketobutanol. This corresponds to a yield of about 80% on the formaldehyde used.

*Example VII*

90 parts of 40% formalin are reacted with 2100 parts of acetone as in Example III. After removal of the acetone, the residual aqueous product is hydrogenated using Raney nickel as catalyst at 50-100 lbs. pressure and 50° C. Fractionation of the hydrogenated product gives a yield of about 70% of diol, together with a small amount of a highly viscous higher-boiling material, boiling point approximately 160° at 1 mm., which from its hydroxyl value is probably a triol derived from dimethylol acetone. The resin formed is very small, amounting to less than one-twentieth of the diol obtained.

*Example VIII*

The crude 3-ketobutanol obtained after the removal of the acetone as in Example IV is hydrogenated using Raney nickel as catalyst. On fractionation of the hydrogenated product, there is obtained a good yield of butylene glycol.

While the invention has been described with particular reference to the production of 3-ketobutanol by the condensation of acetone with formaldehyde, it is in no way limited thereto, as it can be applied to the condensation of acetone and other ketones, for example methyl ethyl ketone and diethyl ketone, not only with formaldehyde but with other aldehydes, for example acetaldehyde.

Having described our invention, what we desire to secure by Letters Patent is:

1. Process for the production of ketomonoalcohols, which comprises maintaining a mixture of 1 mole of formaldehyde and at least 5 moles of a ketone of the formula $CH_3—CO—CH_2R$, where R is selected from the group consisting of hydrogen and methyl, under mildly alkaline conditions at a temperature of at least 50° C. until reaction is substantially complete.

2. Process for the production of 3-ketobutanol, which comprises maintaining a mixture of at least ten moles of acetone and one mole of formaldehyde under mildly alkaline conditions at a temperature of at least 50° C. until reaction is substantially complete.

3. Process for the production of 3-ketobutanol, which comprises maintaining a mixture of at least ten moles of acetone and one mole of formaldehyde under mildly alkaline conditions at the boiling point of the mixture until reaction is substantially complete.

4. Process for the production of 3-ketobutanol, which comprises maintaining a mixture of at least ten moles of acetone and one mole of formaldehyde together with water under mildly alkaline conditions at a temperature of at least 50° C. until the formaldehyde has substantially disappeared.

5. Process for the production of 2-methyl-3-ketobutanol, which comprises maintaining a mixture of at least five moles of methyl ethyl ketone and one mole of formaldehyde under mildly alkaline conditions at a temperature of at least 50° C. until the formaldehyde has substantially disappeared.

6. Process for the production of 2-methyl-3-ketobutanol, which comprises maintaining a mixture of at least five moles of methyl ethyl ketone and one mole of formaldehyde together with water under mildly alkaline conditions at a temperature of at least 50° C. until the formaldehyde has substantially disappeared.

7. Process for the production of 3-ketobutanol, which comprises maintaining a mixture of at least ten moles of acetone and one mole of formaldehyde together with water under mildly alkaline conditions at a temperature of at least 50° C. and after the reaction adding a neutralizing agent for the catalyst to the hot reaction mixture.

JAMES LINCOLN.
JAMES GORDON NAPIER DREWITT.